(12) United States Patent
MacGregor et al.

(10) Patent No.: US 7,270,195 B2
(45) Date of Patent: Sep. 18, 2007

(54) PLASMA CHANNEL DRILLING PROCESS

(75) Inventors: Scott John MacGregor, Glasgow (GB); Steven McCallum Turnbull, Ontario (CA)

(73) Assignee: University of Strathclyde, Glasgow (GB)

(*) Notice: Subject to any disclaimer, the term of this patent is extended or adjusted under 35 U.S.C. 154(b) by 324 days.

(21) Appl. No.: 10/503,998

(22) PCT Filed: Feb. 12, 2003

(86) PCT No.: PCT/GB03/00622

§ 371 (c)(1),
(2), (4) Date: Mar. 8, 2005

(87) PCT Pub. No.: WO03/069110

PCT Pub. Date: Aug. 21, 2003

(65) Prior Publication Data

US 2005/0150688 A1 Jul. 14, 2005

(30) Foreign Application Priority Data

Feb. 12, 2002 (GB) ............................. 0203252.2

(51) Int. Cl.
*E21B 7/15* (2006.01)
(52) U.S. Cl. .......................................... 175/16; 299/17
(58) Field of Classification Search .................... 175/16
See application file for complete search history.

(56) References Cited

U.S. PATENT DOCUMENTS

| 4,169,503 A | * | 10/1979 | Scott ............................ 166/65.1 |
| 4,741,405 A | | 5/1988 | Moeny et al. |
| 5,106,164 A | * | 4/1992 | Kitzinger et al. ............. 299/14 |
| 5,896,938 A | | 4/1999 | Moeny et al. |
| 6,164,388 A | | 12/2000 | Martunovich et al. |
| 6,591,920 B1 | * | 7/2003 | Foppe ............................ 175/67 |

FOREIGN PATENT DOCUMENTS

| RU | 2 123 596 | 12/1998 |
| WO | WO 98/06234 | 2/1998 |

OTHER PUBLICATIONS

S. Pronko, G. Schofield, M. Hamelin, F. Kitzinger; *Megajoule Pulsed Power Experiments for Plasma Blasting Mining Applications*; Digest of Technical Papers of the International Pulsed Power Conference; Albuquerque; Jun. 21-23, 1993; pp. 15-18; vol. 1, Conf. 9; IEEE; U.S. (XP000531047).

(Continued)

*Primary Examiner*—Frank Tsay
(74) *Attorney, Agent, or Firm*—Alston & Bird LLP

(57) ABSTRACT

Material is removed from a body of material, e.g. to create a bore hole, by plasma channel drilling. High voltage, high energy, rapid rise time electrical pulses are delivered many times per second to an electrode assembly in contact with the material body to generate therein elongate plasma channels which expand rapidly following electrical breakdown of the material causing the material to fracture and fragment.

40 Claims, 5 Drawing Sheets

OTHER PUBLICATIONS

M. Hamelin, F. Kitzinger, S. Pronko, G. Schofield; *Hard Rock Fragmentation with Pulsed Power*; Digest of Technical Papers of the International Pulsed Power Conference; Albuquerque; Jun. 21-23, 1993; pp. 11-14; vol. 1 Conf. 9; IEEE; U.S. (XP000531046).

S.M. Turnbull, J.M. Koutsoubis, S.J. MacGregor; *Development of a High Voltage, High PRF PFN Marx Generator*; Power Modulator Symposium; Conference Record of the 1998 Twenty-Third International; Rancho Mirage, CA; Jun. 22-25, 1998; pp. 213-216; IEEE; U.S. (XP010318950).

S.J. MacGregor, S.M. Turnbull, F.A. Tuema; *A Combined High-Voltage, High-Energy Pulse Genator*; Measurement Science and Technology; Dec. 1, 1994; pp. 1580-1582; vol. 5, No. 12, IOP Publishing; Bristol, GB (XP000493685).

I.V. Lisitsyn, H. Inoue, I. Nishizawa, S. Katsuki, H. Akiyama; *Breakdown and Destruction of Heterogeneous Solid Dielectrics by High Voltage Pulses*; Journal of Applied Physics; Dec. 1, 1998; pp. 6262-6267; vol. 84, No. 11; American Institute of Physics.

S. Boev, V. Vajov, B. Levchenko, D. Jgun, V. Muratov, S. Peltsman, A. Adam, K. Uemura; *Electropulse Technology of Material Destruction and Boring*; 11th IEEE International Pulsed Power Conference; Baltimore; 1997; pp. 220-225; vol. 1.

H. Inoue, I. Lisitsyn, H. Akiyama, I. Nishizawa; *Drilling of Hard Rocks by Pulsed Power*; IEEE Electrical Insulation Magazine; 2000; pp. 19-25; vol. 16.

International Search Report for PCT/GB03/00622 completed Jun. 18, 2003.

* cited by examiner

PLASMA CHANNEL DRILLING PROCESS

CROSS-REFERENCE TO RELATED APPLICATION

This application is a Section 371 National Stage Application of International Application No. PCT/GB03/00622 filed on Feb. 12, 2003.

BACKGROUND OF THE INVENTION

1) Field of the Invention

The present invention relates to a method and apparatus for removal of material from a body of material and, in particular but not exclusively, to a method and apparatus for removal of material to form a bore during drilling operations.

2) Description of Related Art

Currently known methods of plasma or electric arc drilling rely on the process of heating the material to be removed to its melting point. This process requires a significant amount of electrical power, and has the further difficulty of accurately focussing the power source on the material, or formation, which is to be removed. This may, therefore, result in the production of wide "kerfs" being formed during the process of producing a bore, as well as the waste of electrical power.

Another known method is spark drilling which utilises an electro-hydraulic shockwave, initiated by a plasma discharge, which propagates through a fluid medium and impinges on the material causing the material to disintegrate or fracture. The major difficulty with this process is focussing the shockwave onto the material. If the shockwave is not focussed much of the shockwave energy is wasted resulting in a poor "drilling" rate. In addition, the resulting hole is not a clearly defined, circular borehole.

It is an object of the present invention to obviate or mitigate at least one of the problems associated with the prior art.

BRIEF SUMMARY OF THE INVENTION

According to a first aspect of the present invention there is provided an apparatus adapted for removal of material from a body of material, the apparatus comprising a high voltage pulse generator coupled to an electrode assembly located at a material-removal station of said apparatus, said apparatus being adapted to generate electrical pulses to create a plasma channel repetitively per second within or on the surface of the body of material and material is removed by the rapid expansion of each plasma channel fracturing and fragmenting the body of material.

The electrical breakdown of a solid body of material by plasma-channel drilling in accordance with the present invention results in the formation of an electrically conductive gas-plasma-filled breakdown channel in or on the solid body. The electrical resistance of this plasma-filled breakdown channel correlates with the physical properties of the solid body and depends on characteristics of the discharge circuit of the pulsed generator and the electrode assembly (initial potential of output, capacitance of the circuit, inter-electrode spacing). As the discharge channel expands during the first hundreds of nanoseconds after the electrical breakdown of the material, the diameter of the discharge channel increases from several micrometers to several hundred micrometres, so as to accommodate the high current from the driving circuit. This expansion of the discharge channel acts like a piston on the surrounding material, causing the material to fracture and fragment.

By virtue of the present invention the plasma channel, which is generally elongate, is formed many times per second with different angular (radial) orientation and an effective and controlled drilling action is achieved without the requirement to heat the rock formation or body of material to its melting point or to focus a shockwave onto the surface of the formation or body of material or to have a rotary drill bit.

Preferably, the high voltage pulsed generator is capable of producing high peak powers in the range 1-100 MW. Peak powers which have been found to be effective in particular tests are 5, 8 and 12 MW.

Preferably, the high voltage pulsed generator includes a drive circuit to enable high voltage pulses in the range 10-50 kV to be produced. The applied voltage pulses may be of a positive or negative polarity. Positive polarity voltage pulses are preferred because the plasma channel extinguishes more rapidly than with the negative polarity voltage pulses.

Preferably, the generator is capable of producing high voltage pulses having an energy level in the range of 10-500 Joules.

The drive circuit may allow a pulse repetition rate in the range 1-100 pulses per second for the high voltage pulses to be produced, although a repetition rate of between 5 and 25 pulses per second is typical.

Preferably, the pulse created by the pulse generator is in the form of an impulse and has a duration in the range 1-50 microseconds with a rise time less than 150 nanoseconds. A pulse rise time of the order of 100 nanoseconds is preferred.

One factor that limits the effectiveness of the pulse repetition rate in removal of material, is the time it takes for the plasma channel to deplete to a sufficient level before the creation of a next plasma channel can have full effect in removal of the material. Therefore, preferably, the pulse generator produces a high voltage pulse which has a current waveform close to that of the critically damped response of the circuit created when the plasma channel is produced.

The electrode assembly comprises at least one electrode pair formed by two electrodes between which the plasma channel is formed: a first electrode being a high voltage electrode, and a second electrode being a return.

Preferably, the two electrodes are co-axially arranged.

Advantageously the electrodes are arranged such that they may contact the surface of the material to be removed.

The electrode assembly may be provided in a number of shapes and sizes. In one embodiment the electrode assembly includes an internal disc shaped electrode and an external cup-like electrode, with an annular inter-electrode gap.

The apparatus may be provided with means for removal of waste material from the cutting surface. The outer electrode may be adapted to allow a fluid to be transferred to the cutting surface so as to remove the waste material. The outer electrode may be further adapted to allow the fluid to be circulated around or through said outer electrode. The fluid preferably has the dual function of removing waste material and functioning as a cutting/lubricating fluid. For this latter purpose it is preferred that the fluid is of low conductivity, such as tap water or mineral oil.

The outer electrode maybe of the form of a cylindrical cage-like structure that is provided with suitable fluid ingress holes, and apertures or slots to allow fluid-entrained removed-material to escape, when using the apparatus to produce a bore in the material.

The sizes for the various components of the electrode assembly will vary depending on the size of bore to be created, however, for an electrode assembly having an external electrode of 50 mm diameter, the central electrode disc may be around 30 mm in diameter and the inter-electrode gap spacing about 7 mm, with the external cup electrode being around 3 mm thick.

Preferably, the inter-electrode gap spacing together with the parameters of the electrical drive circuit are optimised in conjunction with the physical properties of the material to be removed, such that the current waveform produced is close to the critically damped response.

For drilling in hard rock conditions it has been found that when the end face of the outer electrode is sharpened a better drilling rate is achieved in comparison with a non sharpened electrode. In test bore holes in samples of hard sandstone the sharpened drill assembly demonstrated a drilling rate of 2.5 cm/min in comparison with a drilling rate of 0.6 cm/min for the non-sharpened outer electrode. In test bore holes drilled in soft sandstone both drill heads demonstrated approximately equal drilling rates.

In one embodiment the electrode assembly may be in the form of a sonde and the high voltage pulse generator an electrical cartridge. This configuration enables the sonde and cartridge to be deployed down-hole in a well or bore by means of coiled tubing, drill pipe, wireline or the like.

The electrical cartridge may be adapted such that it may be coupled to a cable, thereby enabling the electrical cartridge to be powered by a surface-located power source.

Alternatively, the electrical cartridge may be adapted such that it may be powered by a down-hole power source such as a mud-driven generator.

According to a second aspect of the present invention, there is provided a method of removing material from a body of material, the method comprising the steps of providing a high voltage pulsed generator coupled to an electrode assembly, and repeatedly per second generating electrical pulses which create a plasma channel within or on the surface of the body of material, thereby causing material to fracture and fragment from the body due to the rapid expansion of each plasma channel following electrical breakdown of the material.

Preferably, the method includes the step of contacting the electrodes of the electrode assembly with the surface of the body of the material.

Preferably the method further includes the step of removal of waste material fractured and fragmented from the body of material.

In one embodiment the method also includes the step of ensuring the body of material, or at least a surface portion of said body of material, is immersed in a liquid, such as water. Alternatively the body of material may be dry.

BRIEF DESCRIPTION OF THE SEVERAL VIEWS OF THE DRAWINGS

These and other aspects of the present invention will become apparent from the following description when taken in combination with the accompanying drawings, in which.

DETAILED DESCRIPTION OF THE INVENTION

Plasma-channel drilling, as explained herein, is the process of delivering electrical power to an electrode assembly acting as a drill bit, in a sequence of discrete high power pulses to form highly destructive short lived electrical plasma channel discharges, which in turn cause localised fragmentation and disintegration of a material, such as a rock structure, ahead of the electrode assembly.

Figure 1:
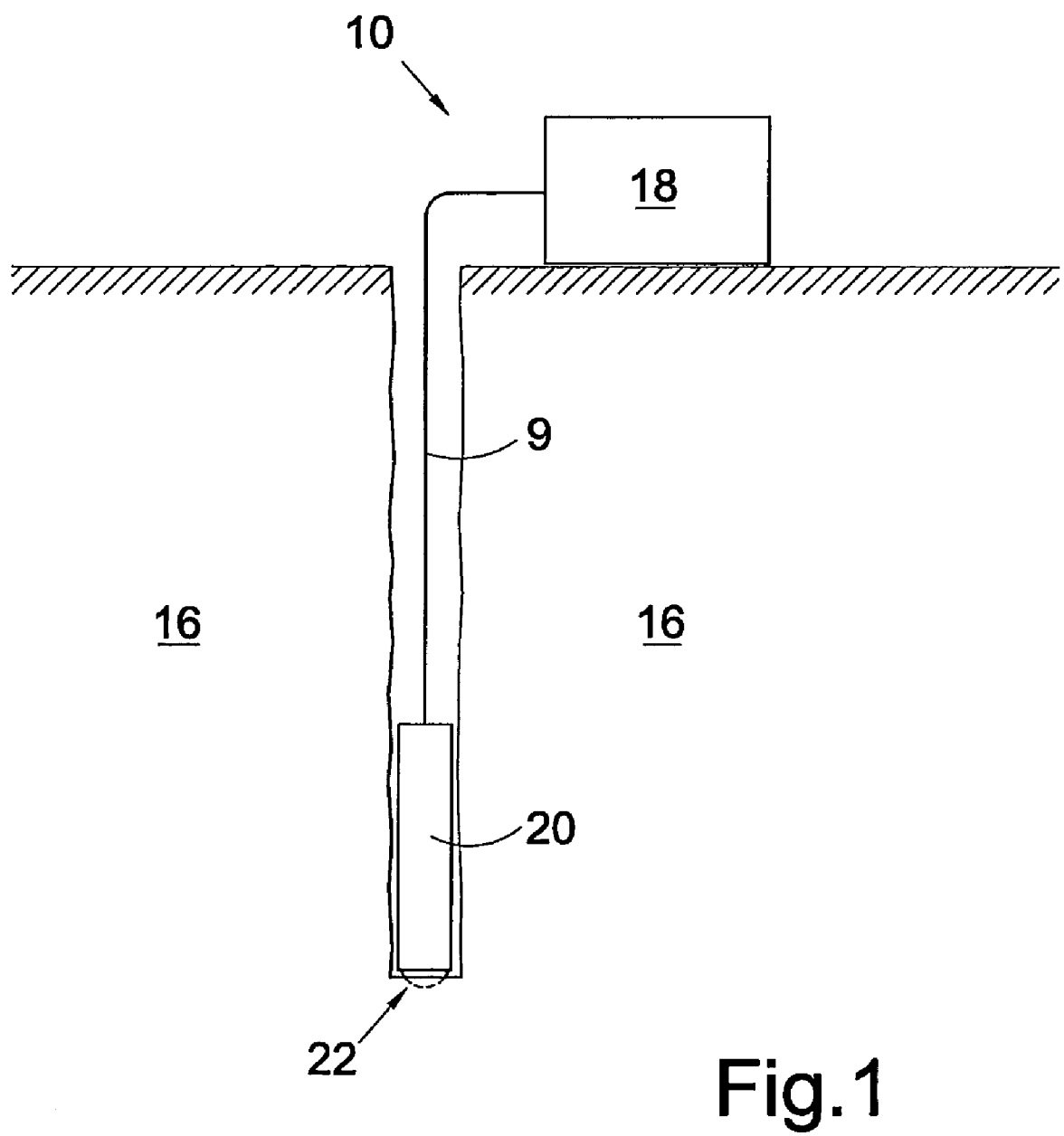
FIG. 1 is a schematic diagram of a plasma channel drilling apparatus according to the present invention.

Referring to FIG. 1, there is illustrated a plasma-channel drilling apparatus, generally represented by reference numeral 10, for removal of surface material 12 from a body of material 16. The apparatus 10 comprises a high voltage pulsed generator 18 which is coupled by an HV cable 9 to an electrode assembly 20. The electrode assembly 20 is arranged such that a plasma channel 22 is produced within or on the surface of the body of material 16, which causes a localised region of the surface material 12 to fracture and fragment.

The high voltage pulsed generator 18 includes a drive circuit capable of producing high voltage pulses, between 10-50 kV at an energy level of about 10-500 Joules per pulse. The drive circuit also enables a pulse repetition rate of 1-100 pulses per second to be produced at the electrode assembly 20, thereby forming a plasma channel at up to 100 times per second resulting in an effective and controlled drilling process.

An increase in the pulse repetition rate of the HV generator 18 does not necessarily result in an increase in the drilling rate of the plasma channel drilling apparatus 10. In one test bore holes drilled using a drive circuit set to 35 kV at an energy level of 122.5 Joules per pulse, resulted in a drilling rate of 5 cm per minute at a pulse repetition rate of 10 pulses per second. However, in a different sample a drilling rate of 6.5-7.5 cm per minute was achieved with a pulse repetition rate of 5 pulses per second.

Furthermore, the pulse repetition rate has a direct effect on the energy efficiency of the apparatus, with a decrease in the pulse repetition rate resulting in a decrease in the specific energy consumption. Thus a 20% decrease in the specific energy consumption was achieved at a pulse repetition rate of 5 pulses per second compared to that of 10 pulses per second, when drilling with apparatus set at an energy level of 207.5 Joules per pulse, 38.5 KV and output generator capacitance of 280 nF.

The pulse repetition rate as regards removal of material is related to the time taken for the created plasma-channel to deplete to a sufficient level, before a succeeding generated plasma channel can have full effect on removal of material. This is due to the fact that the plasma channel causes the material to fracture and fragment by rapid expansion of the plasma channel on or within the surface of the material, and it is therefore necessary to wait until the created plasma channel has subsided sufficiently before the next plasma channel is created.

An increase in the pulse energy of the HV generator has a direct effect on the specific energy consumption of the plasma channel drilling process. The increase of the energy available per pulse results in improvement of the energy efficiency of the plasma drilling channel apparatus. In test bore holes drilled in sandstone samples using a drive circuit set to 35 kV at an energy level of 61 J/pulse resulted in a specific energy of drilling of 803 J/cm$^3$ at a pulse repetition frequency of 10 pulses per second, and in a specific energy of drilling of 474 J/cm$^3$ at a pulse repetition frequency of 5 pulses per second at an energy level of 122.5 J/pulse. Increasing the energy available per pulse by a factor of 2 for a constant voltage resulted in a 59% reduction in the specific energy of drilling. Further increase of the energy would result in saturation and a consequent decrease in the efficiency of the drilling apparatus. Therefore for maximising of the efficiency of the plasma channel drilling apparatus it is necessary to determine the optimal parameters (particularly applied voltage, pulse repetition frequency, energy available per pulse) for different materials to which the plasma-channel drilling apparatus is being applied.

Figure 2:
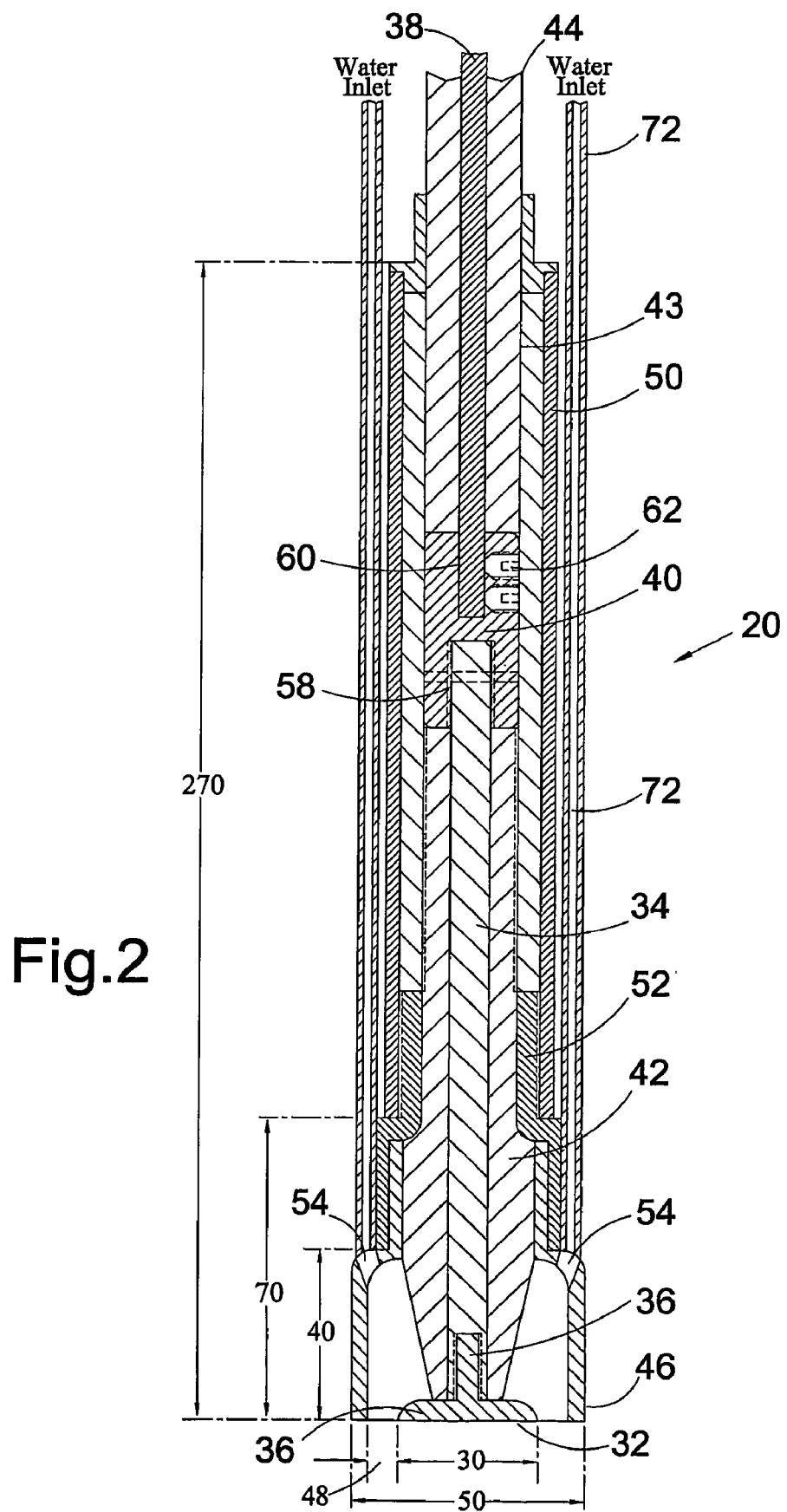
FIG. 2 is a cross-section view of the electrode assembly of FIG. 1.

Referring to FIG. 2, there is shown a cross section of the electrode assembly 20 of FIG. 1. The electrode assembly 20 comprises a HV electrode 32 which is made from a material such as stainless steel in order to increase the lifetime and reliability of the overall assembly. The HV electrode 32 is coupled to an HV shank 34 by a threaded and pinned portion 36 so as to secure the electrode 32 in position. The HV shank 34 is in turn coupled via a connector 40 to the core 38 of HV cable 9 connecting pulse generator 18 to the electrode assembly 20.

The connector 40 is arranged such that at one end of the connector 40 there is provided a threaded portion 58 into which the HV shank 34 is coupled, and at an opposite end there is provided a bore 60 into which the cable core 38 is fitted. The HV cable core 38 is secured in place via grub screws 62.

Surrounding the shank 34, connector 40 and cable core 38 are plastic insulators 42, 43, 44 which prevent electrical breakdown from occurring between the HV components of the electrode assembly and the return, or grounded portions of the electrode assembly.

A cup-shaped grounded electrode 46 surrounds the HV electrode 32, there being a predetermined inter-electrode gap spacing 48 between the two electrodes 32, 46. Electrode 46 at its exposed annular end lies in the same plane as the exposed outer surface of the disc electrode 32 (and may have a sharpened end face or edge). The grounded electrode 46 is electrically connected to a grounded metal tube or pipe 50, such as copper, via a conductive sleeve 52, which has male and female threaded portions, to which the metal pipe 50 and grounded electrode 46 are respectively connected. The metal pipe 50 is electrically connected at an opposite end, via cable 9 to the pulse generator 18, creating a return path for the flow of current to pass when the plasma channel 22 is created. The upper portion of the grounded electrode 46 is provided with slots 70 and with through holes 54 to which are connected pipes 72 allowing a fluid such as water to be passed to the inter-electrode gap 48.

Figure 3:
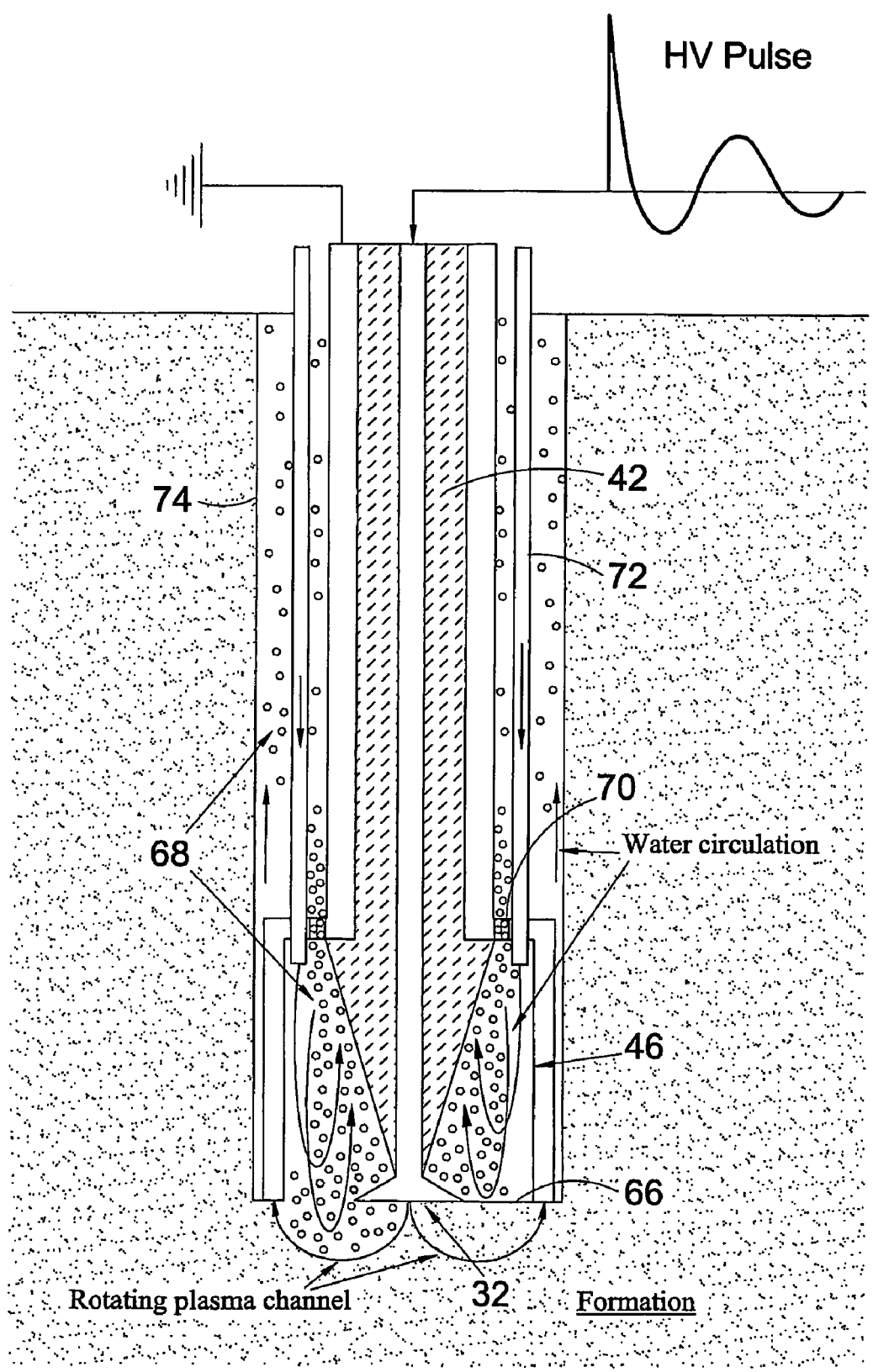
FIG. 3 is a schematic diagram of the plasma channel drilling process.

As is schematically shown in FIG. 3 this arrangement enables a flow of fluid such as water to be supplied to cutting surface 66 to entrain and remove cuttings or debris 68 by circulating water down through the copper pipes 72 and up into the drilled bore 74, such that the water will pick up and carry away the cuttings 68 from the cutting surface 66. The cuttings 68 may be carried away from the cutting surface 66 either traversing the gap 48 between the two electrodes, or, without traversing the gap 48, through venting slots 70 provided in the grounded electrode.

The plasma channel 22 is also shown in FIG. 3 at two of its instantaneous positions during a drilling period. Channel 22 at each time instant is elongate and extends in an arc from an edge or face of electrode 32 to a local region of an inner edge or lower face of the outer electrode 46. FIG. 3 also illustrates the applied electrical pulse in the form of a fast-rise impulse.

Figure 4:
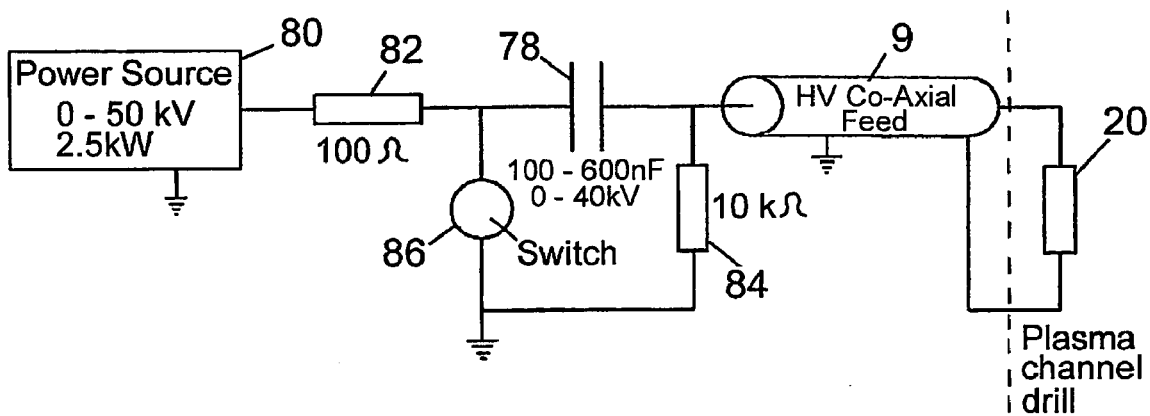
FIG. 4 is a schematic diagram of a pulse generator circuit.
Figure 5:
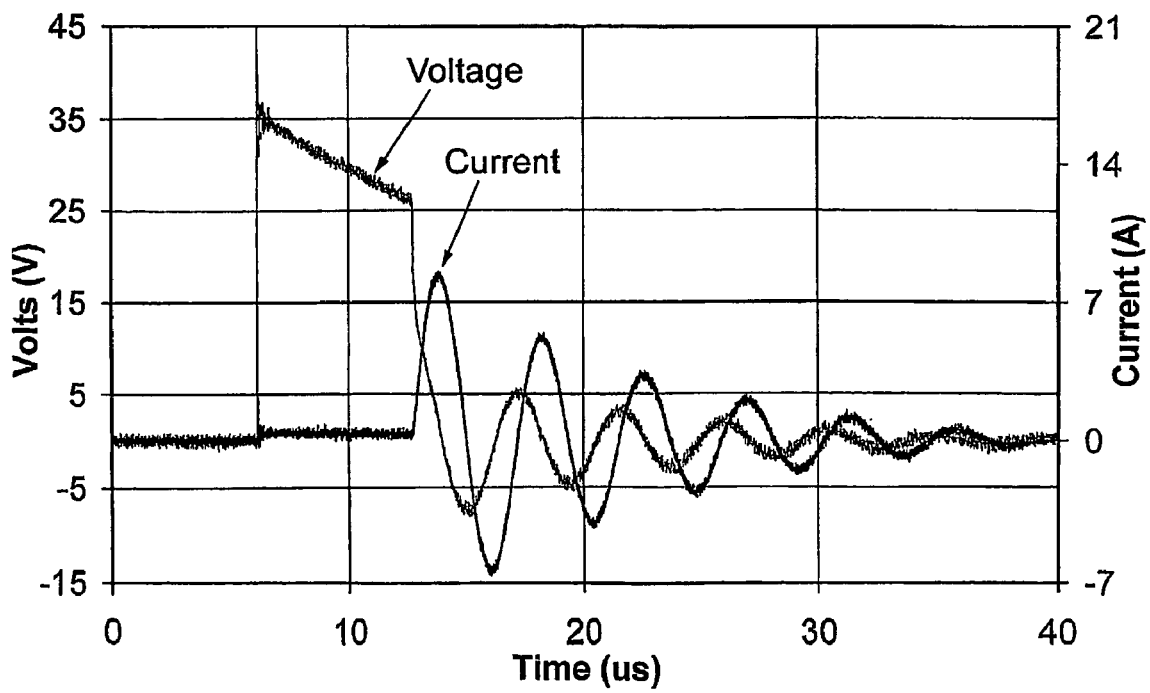
FIG. 5 illustrates typical voltage and current waveforms during plasma-channel formation.

Now referring to FIG. 4, the pulsed generator 18 comprises (typically) an energy storage capacitor 78 which is charged by a primary power source 80 at a voltage level up to 50 kV, via a coupling resistor 82 (e.g. 100 ohms) and a wavetail or decoupling resistor 84 (e.g. 10 kilo-ohms) with switch 86 open. When the capacitor 78 is fully charged, switch 86 is closed on command. The switch closure transfers energy from the capacitor into the electrode assembly 20 via the high voltage co-axial feed 9. Energy from the capacitor 78 and the high voltage co-axial feed 9 is dissipated in the plasma-channel with a current waveform determined by the natural oscillatory frequency of the circuit. This energy dissipation in the plasma-channel results in the drilling process. FIG. 5 illustrates typical current and voltage waveforms generated during plasma channel formation.

Thus, on the micro second timescale denoted in FIG. 5, the first voltage pulse commences at about 6 μs and rises very rapidly in far less than 1 μs to about 35 kV. The voltage level remains in the range 35 kV dropping to 26 kV over the time interval 6 μs to about 13 μs during which time the body of material is electrically stressed but without breakdown occurring. Electrical breakdown occurs at about 13 μs when the conductive plasma channel is formed (and physically expands rapidly) and the voltage collapses in damped oscillation to terminate at about 40 μs whilst concurrently the plasma channel current is established as a damped oscillation also terminating at about 40 μs.

When the energy in the capacitor 78 has been dissipated in the plasma-channel circuit, the power source 80 recharges the capacitor 78 by opening of switch 86, ready for another cycle of the circuit.

Plasma channel creation between the electrodes of the electrode assembly is dependent upon a number of factors, which include the electrode profile, electrical properties of the fluid on or in the material and the material itself; temperature, pressure, voltage magnitude and pulse profile. Furthermore, if the apparatus is self-firing, i.e., there is no trigger signal to initiate the creation of the plasma channel, it is important to provide an electrode assembly having a pre-characterised geometry for the fluid and material present to ensure that the applied high voltage pulse initiates the desired plasma formation. If the electrode assembly is not configured for the specific environmental conditions, then a significant amount of the energy available may be lost through ionic conduction in the fluid.

Figure 6:
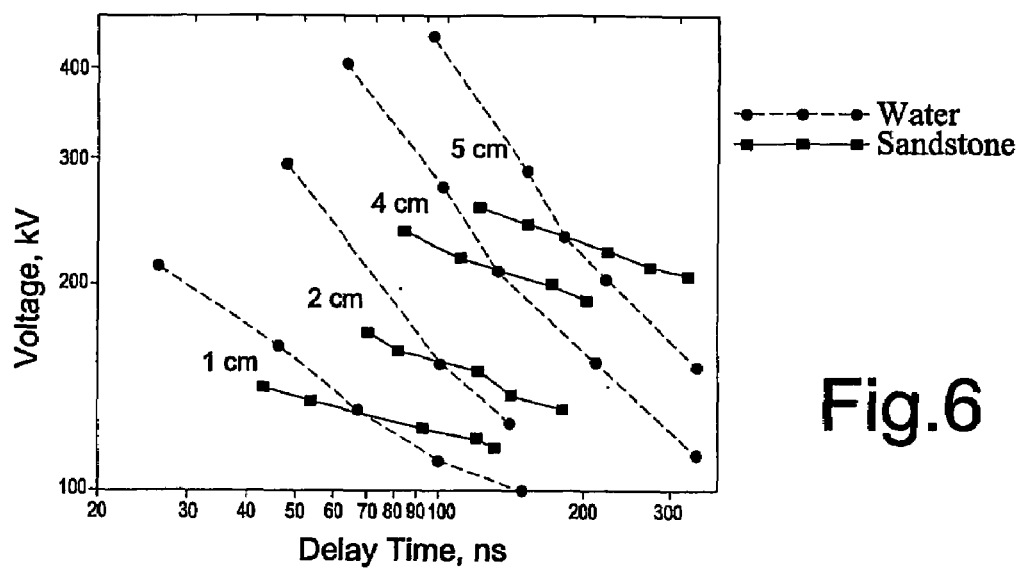
FIG. 6 is a graph showing breakdown delay time-voltage characteristics of sandstone and water for various inter-electrode distances.

It has been found that for fast rising voltages (approximately 10 MV per microsecond), solids suffer dielectric breakdown (plasma formation) earlier than fluids such as water and oil. Referring to FIG. 6, there is provided a graph showing breakdown delay time against voltage characteristics of sandstone and water for different inter-electrode distances. It can be seen for these sets of curves, that if the applied voltage is high enough the sandstone will suffer electrical breakdown (plasma formation) more rapidly than the water.

Figure 7:
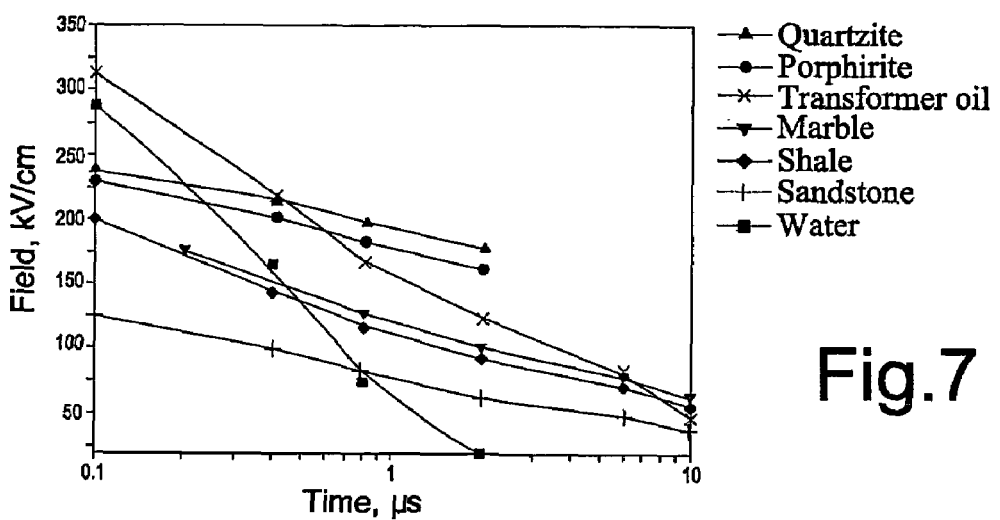
FIG. 7 is a graph showing breakdown delay time-electric field characteristics of water, transformer oil, quazite, porphirite, marble, shale and sandstone.

FIG. 7 shows the relationship between applied electric field and breakdown delay time for different rock structures, transformer oil and water. These sets of curves show the same trend as in FIG. 6, in that if the applied voltage is high enough the different rocks will suffer electrical breakdown more rapidly than water or transformer oil. However, for the transformer oil, it can be seen that the electric field applied to the electrode assembly must be greater than that of water to ensure electrical breakdown in the rock structure before that of the transformer oil. Therefore, for plasma channel drilling it is desirable to apply as high a voltage with as rapid a rise time as possible to the electrodes, in order that the rock suffers electrical breakdown before the water or oil. This would theoretically maximise the efficiency of the drilling process, except that for certain applications it is desirable to restrict the maximum operating voltage of the system to less than 50 kV. Voltages above this value, of 50 kV, result in system insulation requirements becoming of significance, which may result in an increase in the overall size of the drill, electrical feed and power supply.

Figure 8:
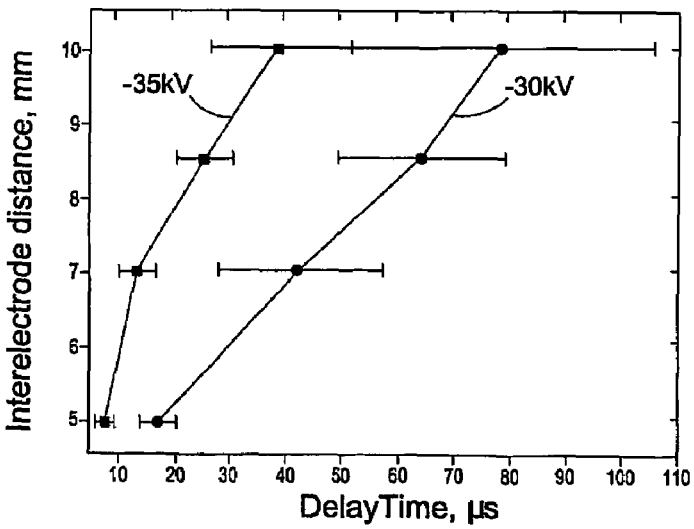
FIG. 8 is a graph of pre-breakdown delay time for water saturated sandstone at different inter-electrode distances.

FIG. 8 shows the relationship for negative polarity pulses between the delay time and electrode gap spacing for water-saturated red sandstone. It can be seen that for both applied voltages (−30 kV and −35 kV) the delay time increases with increasing gap spacing. This is expected since the electric field, which influences the delay time, decreases with increasing gap size. The disadvantage that the delay time has with respect to plasma channel drilling, is that as the delay time increases, the amount of energy available to the plasma channel is reduced due to losses through the water.

Plasma channel drilling can be conducted in rock formations saturated in brine or oil. In spite of the fact that the salinity of connate water in oil bearing rock formation can be as high as 100 g of electrolyte per one liter of water, the use of low conductive water as a drilling fluid significantly reduces the delay time and ionic conduction losses and provides an effective plasma channel drilling process. In test bore holes in sandstone samples the plasma channel drilling apparatus demonstrated a drilling rate of 7.0 cm/min for water-saturated sandstone, and 5.5 cm/min for brine-saturated sandstone with the use of tap water as the drilling fluid. In order to produce efficient plasma channel drilling lower conductivity drilling fluids such as tap water or mineral oil should be used.

Therefore, to maximise the energy available to the plasma channel, the gap spacing must be reduced or the voltage increased in order to reduce the delay time.

As previously stated, plasma-channel drilling uses a plasma discharge that is formed on the surface or through the material to be drilled. Therefore, in order to produce an efficient plasma channel drilling process it is necessary to maximise the rate of pressure rise during the fast expansion period, that is during the first few hundreds of nanoseconds of creating the plasma channel. This may be achieved by maximisation of mean power dissipated in the active load of the plasma channel during the first half period of the current oscillation, which may be accomplished by producing a pulse having a duration in the region of 1-50 microseconds and having a rise time of less than 150 nanoseconds, preferably in the order of 100 nanoseconds.

The pulse generator used to drive the drilling process can generate high peak powers of between 10-100 MW at the electrode assembly. However, due to known pulsed power and energy consumption techniques, the average power output for the generator is in the region of a few kilowatts whilst drilling. This enables the pulse generator and associated equipment to be compact and portable, such that the apparatus can be deployed by wire-line or coiled-tubing equipment into a bore, with the plasma channel apparatus split into a downhole electrode assembly and a surface pulse generator. Alternatively, the pulse generator may be incorporated into an electrical cartridge such that the pulse generator and the electrode assembly may be deployed together within the bore.

By exploiting the differences in temporal dielectric strength between the fluid within the bore and the rock formation, as can be derived from the graphs shown in FIGS. 6 and 7, the plasma-channel is forced to form along the surface of, or inside the formation ahead of the apparatus.

In addition, by utilising single or multiple annular electrode geometries within the electrode assembly, the plasma-channel will change position around the electrode gap so as to seek out new areas of material, such that different sections of the formation are removed. This is achieved because the plasma-channel seeks out the path of least resistance, and because the rock formation electrically breaks-down before that of the fluid, at high voltages, the plasma-channel will be formed within or on the surface of. the formation. The plasma-channel will therefore rotate with time through 360° seeking out the path of least resistance through the material, thereby removing the material ahead of the electrode assembly and eliminating the requirement to rotate the electrode assembly itself.

The electrical breakdown of solids by plasma-channel drilling results in the formation of a gas plasma filled breakdown conductive channel. The resistance of this plasma filled breakdown channel is related to the electrical and physical properties of the channel and depends upon the physical properties of the solids (ionisation potential, molecular weight) and also depends on characteristics of the discharge circuit (initial potential of output, capacitance of the circuit, inter-electrode spacing).

For optimal performance of the plasma-channel drill, the inter-electrode gap spacing together with the parameters of the electrical drive circuit need to be optimised, such that the current waveform produced is close to its critically damped response. In practice, this means that the optimal inter-electrode gap spacing must be determined for the different materials to which the plasma-channel drilling apparatus is being applied.

It is desired to produce a current waveform that is close to its critically damped response as this has been seen to result in the highest rate of energy deposition in the plasma breakdown channel.

It will be appreciated that various modifications may be made to the embodiment hereinbefore described without departing from the scope of the present invention, e.g., a pulse generator which is deployed downhole with the electrode assembly may be powered by a downhole power source, such that there is no need for any surface power to be provided. In this way, the entire apparatus may deployed on drill pipe or the like and power supplied by the downhole power source. The electrode assembly may include more than two electrodes, and the cutting removal fluid may be mud based so as to help balance well conditions.

It will be appreciated that a principal advantage of the present invention is that the above apparatus is small, compact and readily deployable, making the apparatus ideal for work-over applications on platforms, rigs or the like, to maintain maximum well production. Furthermore, the apparatus can produce small bore holes, typically up to 100 mm, that can be exploited to enhance production zones so as to ensure maximum productivity from the well.

In addition, this method of drilling produces sub-millimetre drill cuttings in the region of 300 micrometres, in comparison to that of known systems in which cuttings in the region of 2-7 millimetres are produced. The reduction in the size of the cuttings reduces the need to use equipment to further reduce the cutting size, as is common practice, such that the cuttings can be transported via a pipe network to a storage area. In addition, this method of drilling enables the drill cuttings to be readily re-injected into the subsurface formation, thereby reducing the environmental impact, and the amount of waste produced.

Other advantages of the invention include the possible reduction in fluid pump rates; eliminating the need for rotary equipment to drive the drill bit; and a reduction in the specific energy needed to create a bore hole. Initial results have shown that the specific energy for plasma channel drilling is in the region of 250-290 Joules per cm$^3$, compared to 350-560 Joules per cm$^3$ for rotary (oilfield) drilling, of a medium hardness rock.

The invention claimed is:

1. A method of removing material from a body of material comprising providing a high voltage pulsed generator coupled to an electrode assembly, and repeatedly per second generating electrical pulses with a duration in the range 1-50 microseconds and a voltage rise time of less than 150 nanoseconds to create a plasma channel within or on the surface of the body of material, thereby causing material to fracture and fragment from the body due to the rapid expansion of each plasma channel following electrical breakdown of the material.

2. A method as claimed in claim 1, wherein the pulse voltage rise time is less than 100 nanoseconds.

3. A method as claimed in claim 1, comprising generating pulses that have a current waveform close to that of the critically damped response of the circuit created when the plasma channel is produced.

4. A method as claimed in claim 1, comprising generating pulses with peak powers in the range 1-100 MW.

5. A method as claimed in claim 1, comprising generating high voltage pulses in the range 10-50 kV.

6. A method as claimed in claim 1, comprising generating high voltage pulses having an energy level in the range of 10-500 Joules.

7. A method as claimed in claim 1, comprising generating pulses at a pulse repetition rate in the range 1-100 pulses per second.

8. A method as claimed in claim 7, wherein the pulse repetition rate is between 5 and 25 pulses per second.

9. A method as claimed in claim 1, including the step of contacting the surface of the body of material with the electrodes of the electrode assembly.

10. A method as claimed in claim 1, including the step of transporting waste material from the cutting surface of the body of material.

11. A method as claimed in claim 1, including the step of immersing the body of material, or at least a surface portion of said body of material, in a liquid, such as water.

12. An apparatus comprising a high voltage pulsed generator coupled to an electrode assembly located at a material-removal station, said apparatus being adapted to generate repeatedly per second electrical pulses with a duration in the range 1-50 microseconds and a voltage rise time of less than 150 nanoseconds to create a plasma channel repetitively per second within or on a surface of the body of material, thereby to remove material by the rapid expansion of each plasma channel fracturing and fragmenting the body of material.

13. An apparatus as claimed in claim 12, wherein the high voltage pulsed generator is operable to produce pulses with peak powers in the range 1-100 MW.

14. An apparatus as claimed in claim 12, wherein the high voltage pulsed generator is operable to produce high voltage pulses in the range 10-50 kV.

15. An apparatus as claimed in claim 12, wherein the high voltage pulsed generator is operable to produce high voltage pulses having an energy level in the range of 10-500 Joules.

16. An apparatus as claimed in claims 12, wherein the generator is operable to generate pulses having a pulse repetition rate in the range 1-100 pulses per second.

17. An apparatus as claimed in claim 12, wherein the pulse repetition rate is between 5 and 25 pulses per second and the generator is operable to generate pulses having a pulse repetition rate in the range 1-100 pulses per second.

18. An apparatus as claimed in claim 12, wherein the pulses created by the pulse generator are each in the form of an impulse with a duration in the range 1-50 microseconds and a voltage rise time of less than 150, but typically less than, 100 nanoseconds.

19. An apparatus as claimed in claim 12, wherein the pulse generator produces a high voltage pulse that has a current waveform close to that of the critically damped response of the circuit created when the plasma channel is produced.

20. An apparatus as claimed in claim 12, wherein the electrode assembly comprises co-axially arranged electrodes, one being an internal disc shaped electrode and the other being an outer cylindrical cage-like electrode, with an annular inter-electrode gap.

21. An apparatus as claimed in claim 12, including means for transporting waste material from the cutting surface.

22. An apparatus as claimed in claim 12, including means for transporting waste material from the cutting surface and wherein the outer electrode is adapted to allow a fluid to be transferred to the cutting surface so as to entrain and transport waste material, and to allow the fluid and entrained waste material to be circulated through said outer electrode.

23. An apparatus as claimed in claim 12, wherein the electrode assembly is in the form of a sonde and the high voltage pulsed generator an electrical cartridge, thereby enabling the sonde and cartridge to be deployed down-hole in a well or bore by means of coiled tubing, drill pipe, wireline or the like.

24. A method of removing material from a body of material comprising providing a high voltage pulsed generator coupled to an electrode assembly, and repeatedly per second generating electrical pulses having a voltage in the range 10-50 kV to create a plasma channel within or on the surface of the body of material, thereby causing material to fracture and fragment from the body due to the rapid expansion of each plasma channel following electrical breakdown of the material.

25. A method as claimed in claim 24, wherein each pulse has a duration in the range 1-50 microseconds and a voltage rise time of less than 150 nanoseconds.

26. A method as claimed in claim 24, wherein each pulse has a duration in the range 1-50 microseconds and the pulse voltage rise time is less than 100 nanoseconds.

27. A method as claimed in claim 24, comprising generating pulses that have a current waveform close to that of the critically damped response of the circuit created when the plasma channel is produced.

28. A method as claimed claim 24, comprising generating pulses with peak powers in the range 1-100 MW.

29. A method as claimed in claim 24, comprising generating high voltage pulses having an energy level in the range of 10-500 Joules.

30. A method as claimed in claim 24, comprising generating pulses at a pulse repetition rate in the range 1-100 pulses per second.

31. A method as claimed in claim 24, comprising generating pulses at a pulse repetition rate in the range 5 and 25 pulses per second.

32. A method as claimed in claim 24, including the step of contacting the surface of the body of material with the electrodes of the electrode assembly.

33. A method as claimed in claim 24, including the step of transporting waste material from the cutting surface of the body of material.

34. A method as claimed in claim 24, including the step of immersing the body of material, or at least a surface portion of said body of material, in a liquid, such as water.

35. An apparatus for removal of material from a body of material, the apparatus comprising a high voltage pulsed generator coupled to an electrode assembly located at a material-removal station, said apparatus being adapted to generate electrical pulses in the range 10-50 kV to create a plasma channel repetitively per second within or on a surface of the body of material and material is removed by the rapid expansion of each plasma channel fracturing and fragmenting the body of material.

36. An apparatus as claimed in claim 35, wherein the electrode assembly comprises co-axially arranged electrodes, one being an internal disc shaped electrode and the other being an outer cylindrical cage-like electrode, with an annular inter-electrode gap.

37. An apparatus as claimed in claim 35, wherein the electrode assembly is in the form of a sonde and the high voltage pulsed generator an electrical cartridge, thereby enabling the sonde and cartridge to be deployed down-hole in a well or bore by means of coiled tubing, drill pipe, wireline or the like.

38. A method of removing material from a body of material comprising providing a high voltage pulsed generator coupled to an electrode assembly, and repeatedly per second generating electrical pulses having an energy level in the range of 10-500 Joules to create a plasma channel within or on the surface of the body of material, thereby causing material to fracture and fragment from the body due to the rapid expansion of each plasma channel following electrical breakdown of the material.

39. An apparatus for removal of material from a body of material, the apparatus comprising a high voltage pulsed generator coupled to an electrode assembly located at a material-removal station of said apparatus, said apparatus being adapted to generate electrical pulses to create a plasma channel repetitively per second within or on a surface of the body of material and material is removed by the rapid expansion of each plasma channel fracturing and fragmenting the body of material, wherein the pulse generator produces a high voltage pulse which has a current waveform close to that of the critically damped response of the circuit created when the plasma channel is produced.

40. An apparatus for removal of material from a body of material, the apparatus comprising a high voltage pulsed generator coupled to an electrode assembly located at a material-removal station of said apparatus, said apparatus being adapted to generate electrical pulses to create a plasma channel repetitively per second within or on a surface of the body of material and material is removed by the rapid expansion of each plasma channel fracturing and fragmenting the body of material, wherein the electrode assembly is in the form of a sonde and the high voltage pulsed generator an electrical cartridge, thereby enabling the sonde and cartridge to be deployed down-hole in a well or bore by means of coiled tubing, drill pipe, wireline or the like.

* * * * *

UNITED STATES PATENT AND TRADEMARK OFFICE
CERTIFICATE OF CORRECTION

PATENT NO. : 7,270,195 B2  
APPLICATION NO. : 10/503998  
DATED : September 18, 2007  
INVENTOR(S) : MacGregor et al.

It is certified that error appears in the above-identified patent and that said Letters Patent is hereby corrected as shown below:

On the Title Page, Item -56-
Page 2, OTHER PUBLICATIONS, please add the following:

G.A. VOROB'EV et al., "Criterion of Penetration of Breakdown Channel in Solid Dielectric Which is Located in Insulated Liquid," 1998.

KRIVONOSENKO et al., "Generator of High-Voltage Impulses," 1982.

USOV et al., "Transient Processes in the Systems of Electro-Impulse Technology," Academy of Science of USSR, 1987.

Signed and Sealed this

Thirteenth Day of November, 2007

JON W. DUDAS  
*Director of the United States Patent and Trademark Office*